United States Patent [19]
Inagaki

[11] Patent Number: 5,189,483
[45] Date of Patent: Feb. 23, 1993

[54] APPARATUS FOR MEASUREMENT OF CHROMATIC DISPERSION IN A SINGLE MODE OPTICAL FIBER

[75] Inventor: Shinya Inagaki, Tokyo, Japan

[73] Assignee: Fujitsu Limited, Kawasaki, Japan

[21] Appl. No.: 764,967

[22] Filed: Sep. 25, 1991

Related U.S. Application Data

[63] Continuation of Ser. No. 484,522, Feb. 26, 1990, abandoned.

[30] Foreign Application Priority Data

Feb. 28, 1989 [JP] Japan .................... 1-46903

[51] Int. Cl.$^5$ ............................ G01N 21/84
[52] U.S. Cl. .................................. 356/73.1
[58] Field of Search ....................... 356/73.1

[56] References Cited

U.S. PATENT DOCUMENTS

| | | | |
|---|---|---|---|
| 4,411,520 | 10/1983 | Mochizuri et al. | 356/73.1 |
| 4,556,314 | 12/1985 | Stone | 356/73.1 |
| 4,710,022 | 12/1987 | Soeda et al. | 356/73.1 |
| 4,752,125 | 6/1988 | Schicketanz et al. | 356/73.1 |
| 4,958,910 | 9/1990 | Taylor et al. | 356/73.1 |

FOREIGN PATENT DOCUMENTS 63-309833  12/1988  Japan ................... 356/73.1

OTHER PUBLICATIONS

Cohen, Leonard G. et al., "A Universal Fiber-Optic (UFO) Measurement System Based on A Near-IR Fiber Raman Laser", IEEE Journal of Quantum Electronics, vol. QE-14, No. 11, Nov. 1978.

Kanada, Tetsuya et al., "Optical waveform measurement by optical sampling with a mode-locked laser diode", Optics Letters, vol. 11, No. 1, Jan. 1986.

Kanada, Tetsuya et al., "Single-mode fiber dispersion measurements using optical sampling with a mode-locked laser diode", Optics Letters, vol. 11, No. 5, May 1986.

Primary Examiner—Vincent P. McGraw
Attorney, Agent, or Firm—Staas & Halsey

[57] ABSTRACT

An apparatus for measuring characteristics of chromatic dispersion includes a Raman oscillator generating a laser pulse with wide band wavelength.

The laser pulse generated by a Raman oscillation is transmitted through a selection and reflection film and then through a sample fiber.

At an output end of the sample fiber, a reference wavelength light and an object wavelength light are received so that a delay time of the object wavelength light relative to the reference wavelength light is measured as a factor of a chromatic dispersion of the sample fiber.

3 Claims, 3 Drawing Sheets

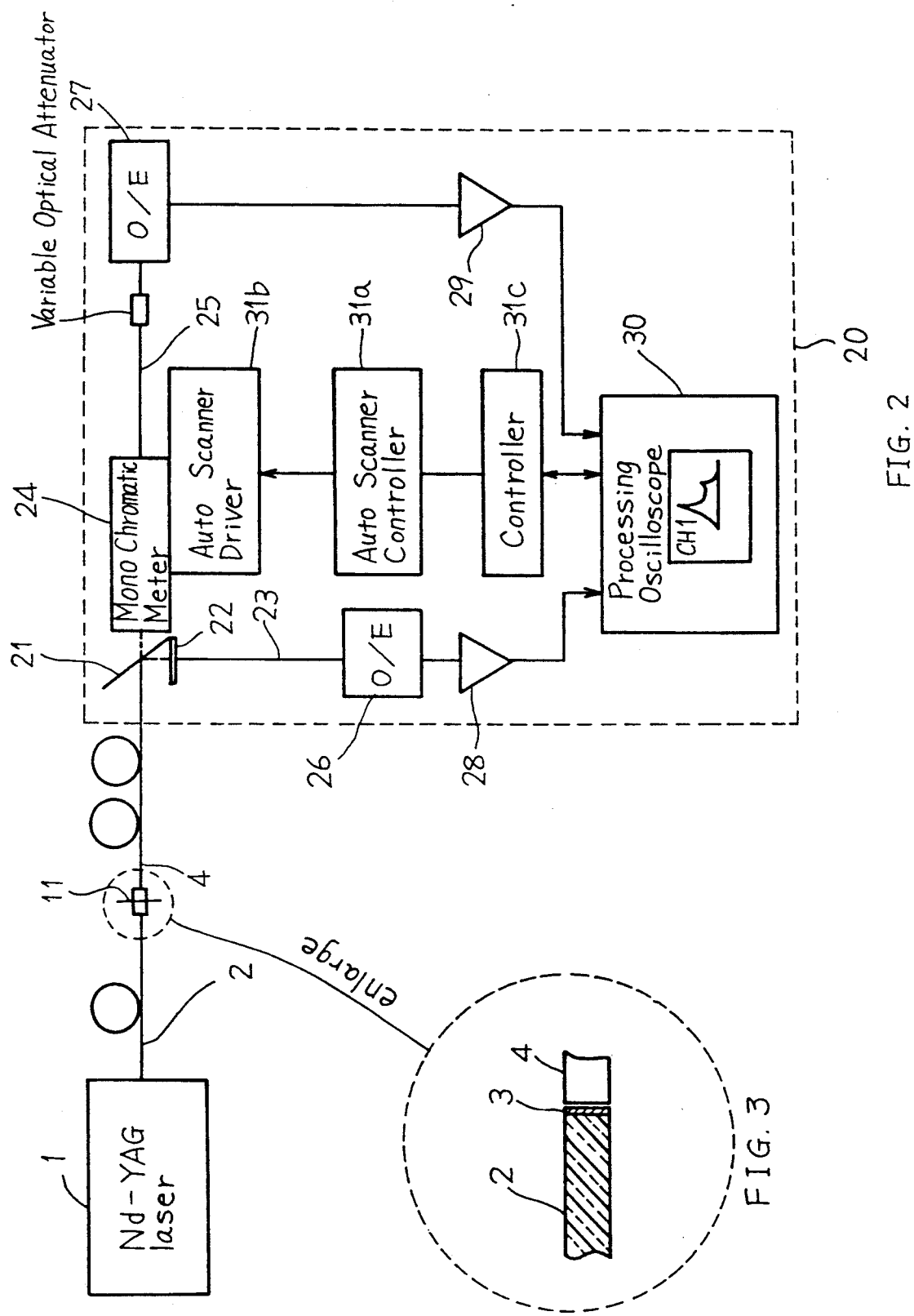

APPARATUS FOR MEASUREMENT OF CHROMATIC DISPERSION IN A SINGLE MODE OPTICAL FIBER

This application is a continuation of application Ser. No. 07/484,522, filed Feb. 26, 1990, now abandoned.

BACKGROUND OF THE INVENTION

The present invention relates to an apparatus for measuring chromatic dispersion characteristic in a single mode optical fiber for optical communication.

The light in the optical fiber is propagated in the fiber at the speed of about 5 μsec/km but chromatic dispersion occurs due to differences of propagation speeds in each of wavelengths. Therefore, the optical pulse signal of small duration expands in the side of output end deforming the waveform and results in the influence on the transmission of optical signal. Accordingly, it is necessary to previously measure the chromatic dispersion characteristic of the optical fiber to be used for the optical communication.

The U.S. Pat. No. 4,710,022 has proposed a method for measuring indirectly such chromatic dispersion characteristic.

As a direct method, the pulse delaying method has also been proposed and described in the following references, (1) L. G. Cohen & C. Lin "A universal fiber-optic (UFO) measurement system based on a near-IR Raman Laser" IEEE J. Quantum Electron., QE-14, pp 855-859 (1985);

(2) T. Kanada & D. L. Franzen "Optical waveform measurement by optical sampling with a mode-locked laser dodes" Opt.Lett., 11, pp 4~6(1986);

(3) T. Kanada & D. L. Franzen "Single-mode fiber dispersion measurement using optical sampling with a mode-locked laser diodes", Opt. Lett., 11, pp 330~332 (1986).

However, these pulse delaying methods have problems in accuracy of measurement and size of apparatus.

SUMMARY OF THE INVENTION

It is an object of the present invention to improve the method for measurement of chromatic dispersion characteristic in the single mode optical fiber based on the pulse delaying method described above.

In order to achieve the object mentioned above, the present invention provides an apparatus for measurement of chromatic dispersion in a single mode optical fiber comprising a laser pulse generating means for generating a laser pulse of a predetermined wavelength, an optical fiber for generating Raman oscillation which inputs and transmits the laser pulse from the laser pulse generating means and causes Raman oscillation during transmission of the laser pulse, a wavelength selection and reflection film which is provided at the output end face of the optical fiber to reflect the light of the predetermined wavelength and to transmit the light generated by Raman oscillation and a delay time measuring means for receiving the optical pulse signal having passed the wavelength selection and reflection film and through a sample fiber and measuring the delay time of the output pulse signal as a function of the optical pulse waveform.

BRIEF DESCRIPTION OF THE DRAWINGS

FIG. 2 is a structural diagram of an embodiment of the present invention;

FIG. 3 shows a sectional side view at the output end side of optical fiber for Raman oscillation;

DETAILED DESCRIPTION OF THE PREFERRED EMBODIMENTS

Figure 1:
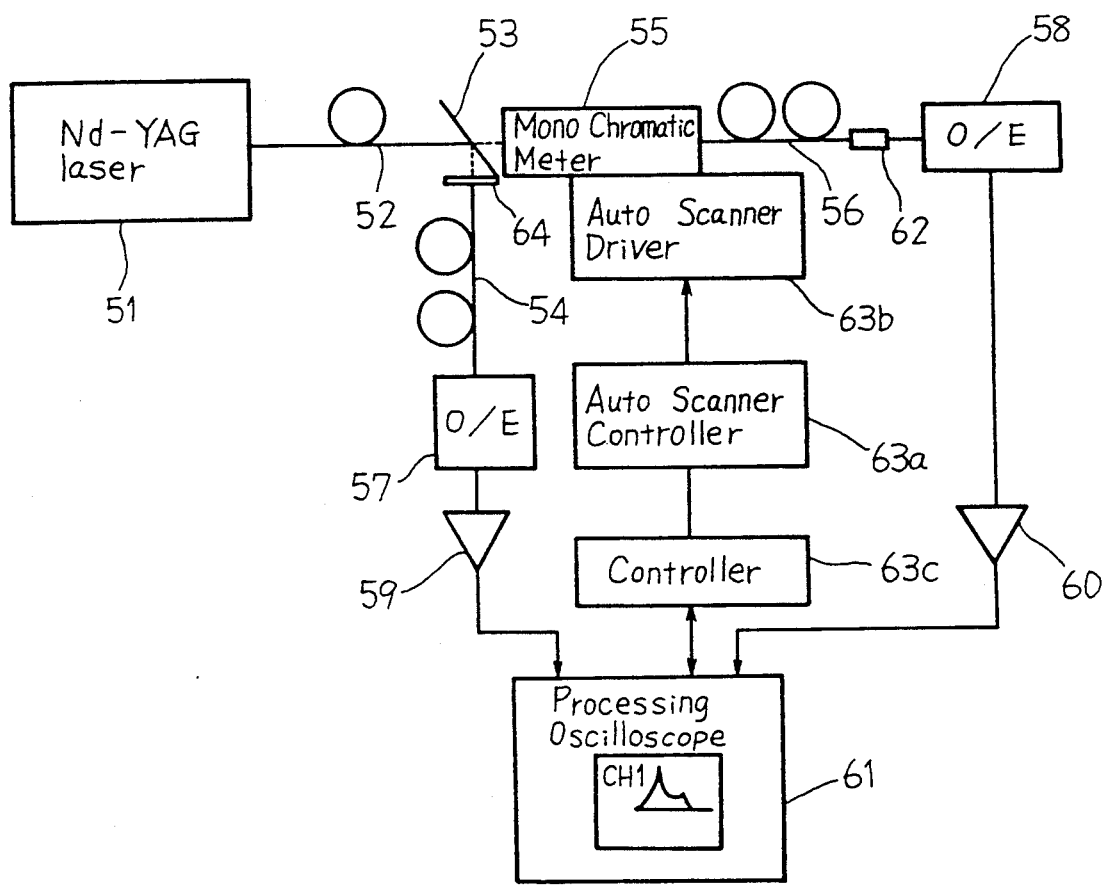
FIG. 1 shows a block diagram of an apparatus for measuring chromatic dispersion characteristic in a single mode optical fiber based on the pulse delaying method.

FIG. 1 is an apparatus for measuring chromatic dispersion characteristic of optical fiber based on the pulse delaying method. The reference numeral 51 designates a laser pulse generating apparatus which generates Nd-YAG laser pulse in the wavelength of 1.06 μm. The laser pulse emitted from such apparatus is output toward an optical beam splitter 53 passing through a quartz fiber 52 for Raman oscillation. By the Raman oscillation in the quartz fiber 52, the light output therefrom includes light in the wavelengths ranging from 1 μm to about 1.6 μm.

The light in the wavelength of 1.3 μm among the output light is input, as the reference light, to a single mode fiber 54 for delaying the reference light signal and the light of other chromatics are input to a monochromatic meter 55 which can select the transmitting wavelength. The light in the wavelength selected by the mono-chromatic meter 55 is input to a single mode sample fiber 56. The light output from the fibers 54, 56 are converted to electrical signals by the photo-electric converters 57, 58, amplified by the amplifiers 59, 60 and differences in incoming times of signals can be observed by a processing oscilloscope 61. Accordingly, a delay time of the light in the wavelength of 1.1 to 1.6 um to the reference light in the wavelength of 1.3 um can be measured by sequentially changing the transmitting wavelength in the mono-chromatic meter 55 and thereby the chromatic dispersion characteristic of sample fiber 56 can be obtained.

In FIG. 1, the numeral 62 designates a variable optical attenuator which can freely attenuate intensity of light passing through the sample fiber 56; 63(a-c), an auto scanner controller, an auto scanner driver and controller for automatically controlling operations of mono-chromatic meter 55 and processing oscilloscope 61; 64, a wavelength selection and transmitting filter which transmits only the light in the wavelength of 1.3 μm.

In such an apparatus for measuring chromatic dispersion characteristic in optical fiber, the length of sample fiber 56 should be in the order of Kilometer in order to obtain a significant difference of the delay times of optical signals Moreover, it is necessary to delay the reference optical signal in the same degree for confirming the relation with the reference signal on the processing oscilloscope 61. Therefore, it is essential to almost accurately match the length of single mode fiber 54 for delaying the reference optical signal with the length of sample fiber 56.

Improvement of the apparatus shown in FIG. 1 may be made with respect to the following points:

(1) If the fiber 52 for Raman oscillation is too short, sufficient Raman oscillation is not carried out. Therefore, the chromatic dispersion of sample fiber 56 cannot be measured. However, if the fiber 52 for Raman oscillation is too long, the optical pulse in the output side may be deformed by the internal chromatic dispersion and thereby a measuring error of chromatic dispersion of sample fiber 56 may be generated.

(2) If the light in the wavelength of 1.06 $\mu$m output from the fiber 52 for Raman oscillation is intensive, the Raman oscillation is also generated within the sample fiber 56 and therefore a measuring error of chromatic dispersion may be generated.

(3) For matching the reference optical signal with the output timing of the light emitted from the sample fiber 56, the single mode fiber 54 is necessary in order to delay the reference optical signal. Moreover, since the total length of single mode fiber 54 must be matched in high accuracy with the total length of sample fiber 56, the manufacturing thereof is very difficult.

A structure of the measuring apparatus having improved on these points is shown in FIG. 2.

The laser pulse in the predetermined wavelength input to the optical fiber 2 for Raman oscillation generates the forward scattered light by Raman oscillation and is then transmitted to the output end side. At the output end face, the light in the predetermined wavelength is reflected by the wavelength selection and reflection film 3 and is then reversely transmitted in the optical fiber 2 for Raman oscillation. Therefore, the light in the predetermined wavelength is not emitted from the optical fiber 2 for Raman oscillation. This also generates the backward scattered light by Raman oscillation at the time of reverse transmission in the fiber 2.

The light in the wavelength other than the predetermined one, namely the light generated by the Raman oscillation passes through the wavelength selection and reflection film 3 and enters the sample fiber 4. This light generates chromatic dispersion within the sample fiber 4 and is then output from the output end face. Accordingly, the light output from the sample fiber 4 encodes all light in the wavelengths generated by the Raman oscillation and this light is output with a delay of output timing due to the chromatic dispersion.

A delay time of the light (optical pulse) output from the sample fiber 4 can be measured as a function of the time of the optical pulse wavelength by the delay time measuring means 20. Thereby, the chromatic dispersion characteristic of sample fiber 4 can be obtained.

Figure 4:
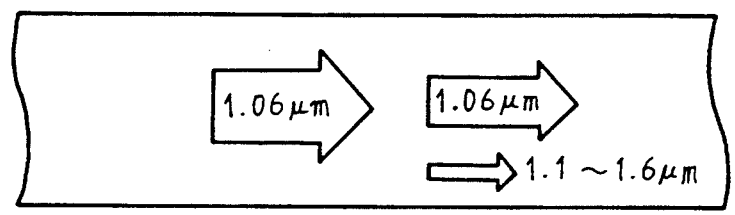
FIG. 4 is a schematic diagram indicating the profile of front scattering light.

FIG. 2 will be explained hereunder in further detail. In FIG. 2, the reference numeral 1 designates a mode-locked Nd-YAG laser pulse generator which generates the laser pulse in the wavelength of 1.06 $\mu$m. The laser pulse output therefrom is input to the optical fiber 2 for Raman oscillation made of quartz glass. As shown schematically n FIG. 4, the forward scattered light in the wavelength ranging from 1.1 $\mu$m to about 1.6 82 m is generated by the Raman oscillation within the optical fiber 2 for Raman oscillation.

Figure 5:
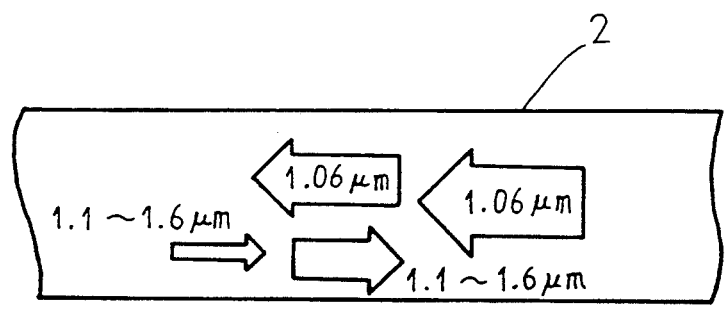
FIG. 5 is a schematic diagram indicating the profile of rear scattering light.

As shown in FIG. 3, the output end face of optical fiber 2 for Raman oscillation is coated with the wavelength selection and reflection film (interference film) 3 which reflects the light in the wavelength of 1.06 $\mu$m but transmits the light of other wavelengths. Accordingly, the light obtained by the Raman oscillation is output forward and only the light in the wavelength of 1.06 $\mu$m is reflected and is reversely transmitted within the fiber 2. As a result, as shown in FIG. 5, the backward scattered light in the wavelength from 1.1 $\mu$m to 1.6 $\mu$m is generated by the Raman oscillation of the reversely transmitted light of 1.06 $\mu$m and the light obtained by the Raman oscillation may be intensified.

In this case, since it is essential for the wavelength selection and reflection film 3 to transmit the light generated by the Raman oscillation, it may be replaced with a selection and reflection film that reflects a range of wavelengths, for example, all light in the wavelengths under 1.06 $\mu$m.

The single mode sample fiber 4, for example, to be used for optical communication is connected to the output end of optical fiber 2 for Raman oscillation through an optical connector 11. The sample fiber 4 is a single mode optical fiber in the light, for example, of 3 km and a delay time measuring means 20 for measuring the delay time of the output optical pulse signal as the function of wavelength of optical pulse is connected to the output end thereof. More specifically, the light output from the sample fiber 4 enters first the optical beam splitter 21. A part of the light having passed the optical beam splitter (for example, 10% of the entire part) passes through the wavelength selection transmitting filter 22 which allows transmission of only the light in the wavelength of 1.3 $\mu$m and enters the fiber 23 for transmitting the reference light, while the other greater part of light enters the mono-chromatic meter 24 which scans the wavelength of the transmitting light. The light in the wavelength selected to pass through the mono-chromatic meter 24 enters the fiber 25 for transmitting the light to be measured. The light output from the optical fibers 23, 25 are respectively converted to electrical signals through the photo-electric converters 26, 27, amplified by the amplifiers 28, 29 and are visually displayed on the processing oscilloscope 30.

Accordingly, difference of incoming times of the light in the wavelength of 1.3 $\mu$m guided to the fiber 23 for transmitting the reference light and the light in respective wavelengths ranging from 1.1 to 1.6 $\mu$m can be detected. Therefore, this structure requires only the very short length fibers 23 for transmitting the reference light and the fiber 25 for transmitting the light to be measured. It is also possible to employ the structure that the light output from the optical beam splitter 21 or mono-chromatic meter 24 is input in direct to the photo-electric converters 26, 27 by omitting these fibers 23, 25.

31$a$, 31$b$ and 31$c$ designate respectively the autoscanner controller, autoscanner driver and controller for automatically controlling operations of monochromatic meter 24 and processing oscilloscope 30. A delay time of light in each wavelength within the sample fiber 4 for the reference light in the wavelength of 1.3 $\mu$m may be measured as the function of wavelength by automatic scanning of the wavelength of the light passing through the mono-chromatic meter in the range from 1.1 $\mu$m to 1.6 $\mu$m. Thereby, the chromatic dispersion characteristic of sample fiber 4 can be obtained.

In this embodiment, the Nd-YAG laser beam in the wavelength of 1.06 $\mu$m has been used but the present invention does not limit the light source only to such laser beam and allows use of laser pulses in other wavelengths.

As described previously, according to the apparatus for measurement of chromatic dispersion in an optical fiber shown in FIG. 2, the laser pulse in the predetermined wavelength for causing the Raman oscillation is reflected by the wavelength selection and reflection film and does not enter the sample fiber Therefore, the sample fiber does not allow successive Raman oscillation. In addition, the backward scattered light is generated within the optical fiber for Raman oscillation with the laser pulse in the predetermined wavelength reflected by the waveform selection and reflection film. As a result, the Raman oscillation beam having sufficient intensity can be generated only with a short length fiber and influence of chromatic dispersion in the fiber for Raman oscillation can be lowered. Accordingly, the chromatic dispersion characteristic of sample fiber can be measured very accurately.

The light output from the sample fiber includes the light in various wavelengths generated by the Raman oscillation and this light is output with delay of output time by the chromatic dispersion. Therefore, it is no longer necessary to delay the optical pulse within the delay time measuring means and the apparatus can be more simply manufactured in comparison with a conventional apparatus.

What is claimed is:

1. An apparatus for measurement of chromatic dispersion in a single mode optical fiber, comprising:
   laser pulse generating means for generating a laser pulse of a predetermined wavelength;
   optical fiber means, operatively connected to said laser pulse generating means, for generating Raman oscillation of the laser pulse;
   wavelength selection and reflection film means, provided at an input end face of the optical fiber means, for reflecting light of the predetermined wavelength and for transmitting light generated by Raman oscillation;
   a sample optical fiber operatively connected to said selection and reflection film means so as to transmit the light generated by Raman oscillation; and
   delay time measuring means for receiving the light transmitted through said sample fiber and for measuring a delay time of the receiving light as a function of optical wavelength, said delay time measuring means includes
   first means for receiving light of a reference wavelength from said sample optical fiber, wherein said reference wavelength is selected so as to include a wavelength having no chromatic dispersion in said sample optical fiber,
   second means for selectively receiving object wavelength light among a plurality of light wavelengths from said sample optical fiber, and
   third means for measuring a delay time of the object wavelength relative to the reference wavelength.

2. An apparatus according to claim 1, wherein said second means changes a wavelength of the object wavelength light.

3. An apparatus according to claim 1, wherein said optical fiber means is a quartz optical fiber.

* * * * *

UNITED STATES PATENT AND TRADEMARK OFFICE
CERTIFICATE OF CORRECTION

PATENT NO.  : 5,189,483                        Page 1 of 2
DATED       : February 23, 1993
INVENTOR(S) : Shinya INAGAKI It is certified that error appears in the above-identified patent and that said Letters Patent is hereby corrected as shown below:

Column 1, line 66, after "and" insert --for--.

Column 2, line 58, change "Kilometer" to --kilometer--; and
         line 60, after "signals" insert --.--.

Column 3, line 56, change "n" to --in--; and
         line 57, change "82" to --$\mu$--.

Column 4, line 15, change "light" to --length--;
         line 49, change "monochromatic" to
--mono-chromatic--; and
         line 68, after "fiber" insert --.--.

Column 5, line 29, change "input" to --output--.

UNITED STATES PATENT AND TRADEMARK OFFICE
CERTIFICATE OF CORRECTION

PATENT NO. : 5,189,483
DATED : February 23, 1993
INVENTOR(S) : Shinya INAGAKI

It is certified that error appears in the above-indentified patent and that said Letters Patent is hereby corrected as shown below:

Column 6, line 9, change "receiving" to --received--.

Signed and Sealed this

Fourth Day of January, 1994

Attest:

BRUCE LEHMAN

*Attesting Officer*  *Commissioner of Patents and Trademarks*